Aug. 10, 1965 E. S. BUSH 3,200,403

INFORMATION RECORDING DEVICE

Filed Nov. 1, 1963

2 Sheets-Sheet 1

INVENTOR.
EUGENE S. BUSH

BY Eugene M. Eckelman

ATTORNEY

INVENTOR.
EUGENE S. BUSH
BY Eugene M. Eckelman
ATTORNEY

United States Patent Office 3,200,403
Patented Aug. 10, 1965

3,200,403
INFORMATION RECORDING DEVICE

Eugene S. Bush, Milwaukie, Oreg., assignor to E. S. Bush & Company, Milwaukie, Oreg., a corporation of Oregon Filed Nov. 1, 1963, Ser. No. 320,672
5 Claims. (Cl. 346—61)

This invention relates to new and useful improvements in information recording devices.

Recording devices have heretofore been employed in combination with vehicles or the like to log driver operations of the vehicle and more particularly the operation of the vehicle motor. Some of these recording devices are principally directed to logging engine operation such as revolutions per minute or manifold vacuum pressure. While this information is valuable to the vehicle operator, it is not sufficiently comprehensive to show other important functions of vehicle operation. Such other functions of vehicle operation may be directed to the scheduled running of the vehicle. Also, devices heretofore employed made no provision for easy inspection of recorded tape in the order in which data were imprinted thereon.

Accordingly it is a primary objective of the present invention to provide an information recording device for vehicles adapted to imprint on tape a combination of vehicle management data comprising motor operation, mileage designations, time intervals, speed, and to include a write-in area. It is to be understood that the invention as defined in this object is not limited to the entire combination enumerated, however, and may as well reside in sub-combinations thereof.

Another object is to provide recording devices of the type described having a novel structural arrangement adapted to record certain data of vehicle operation, on tape.

Still another object is to provide a recording apparatus of the type described which is arranged so that it can be mounted in the operator's compartment for easy viewing by the operator and which employs a novel arrangement of tape storage which facilitates ready removal and inspection of the tape.

Still another object is to provide a novel tape structure adapted to record data of vehicle and motor operation, mileage designations, time intervals, running speed, and write-in remarks.

Briefly stated recording apparatus of the instant invention is enclosed in a housing adapted for mounting preferably in the cab of a vehicle. Incorporated in the housing is a tape driven at a uniform speed through an area of marking wherein apparatus in such marking area imprints designations showing motor operation, mileage designations, running speed of the vehicle and in general operator management of the vehicle. The tape employed is transparent and utilizes two parallel sets of reference lines separated by blank tape area.

Apparatus is employed for moving the tape at a uniform speed in combination with other apparatus which imprints on the moving tape the functions hereinbefore mentioned. Although the invention is described herein as being associated with a vehicle it can as well be associated with any motor driven device utilizing a drive shaft such as a boat.

The invention will be better understood and additional objects will become apparent from the following specification and claims, considered together with the accompanying drawings, wherein the numerals of reference indicate like parts and wherein:

Figures 1, 2, 3, 11:
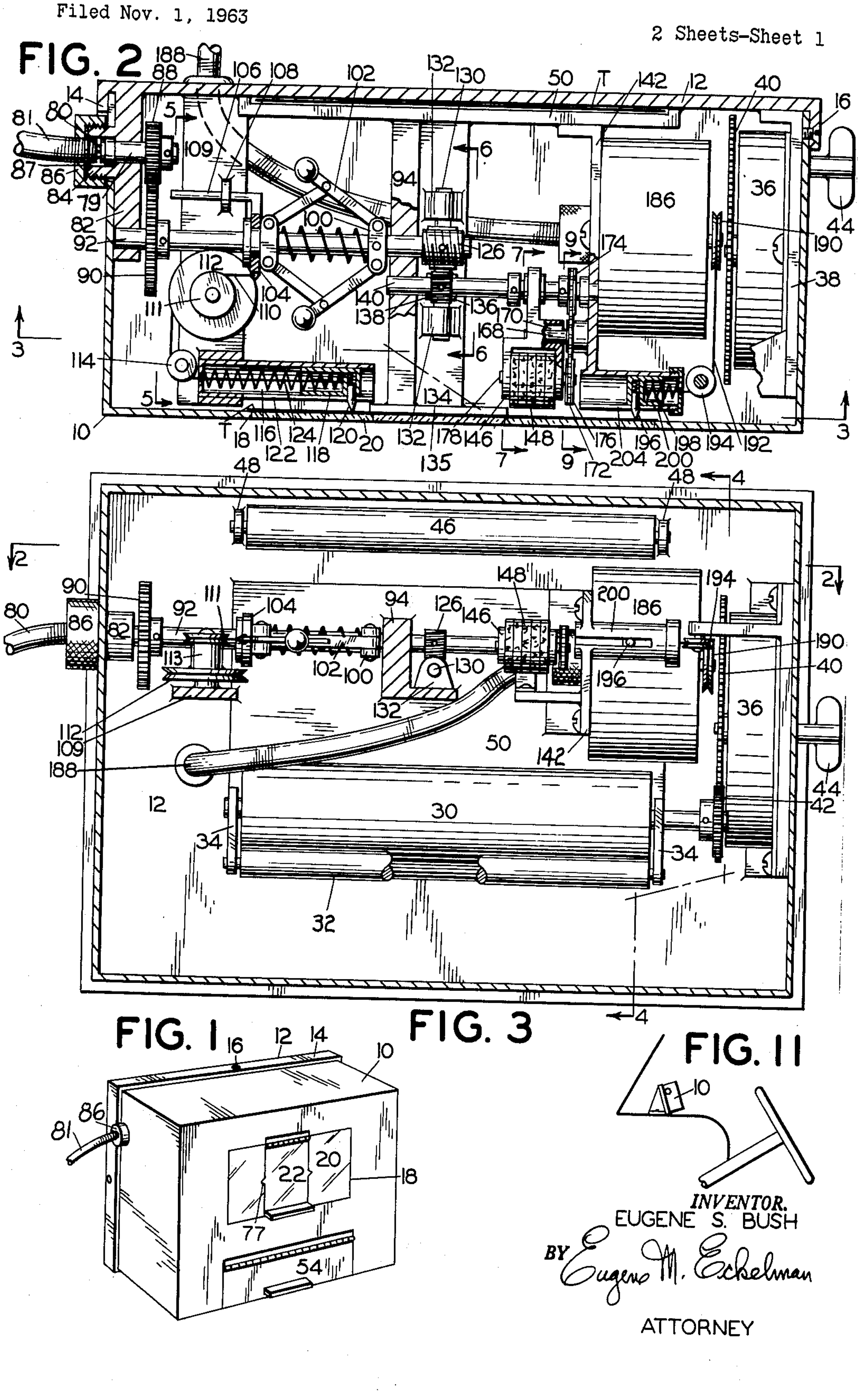
FIGURE 1 is a perspective view of the present device as enclosed in a housing and arranged for mounting in the cab of a vehicle.
FIGURE 2 is a horizontal sectional view looking downwardly and taken on the line 2—2 of FIGURE 3.
FIGURE 3 is a vertical sectional view taken on the offset line 3—3 of FIGURE 2.
FIGURE 11 is a side elevational view in reduced scale, of an operator's compartment with the present device installed therein.

Referring now in particular to the drawings, and first to FIGURES 1–4, the apparatus of the present invention is incorporated in a housing 10 having a removable back wall 12. In a preferred arrangement the back wall 12 has a peripheral flange 14 for confining a portion of the housing and removably attached thereto by means of screws 16, FIGURES 1, 2, and 4. As best seen in FIGURES 1 and 2 the housing 10 has a front window or opening 18 which is covered by a transparent pane 20 such as glass or clear plastic. The pane 20 has a central door portion 22 hinged at its upper end and also formed of transparent material. As will be seen hereinafter, the window 18 serves to inspect data on a tape which moves flush along the backside of the window, and if desired the door portion 22 can be opened for the purpose of inscribing handwritten data on the tape.

Figure 4:
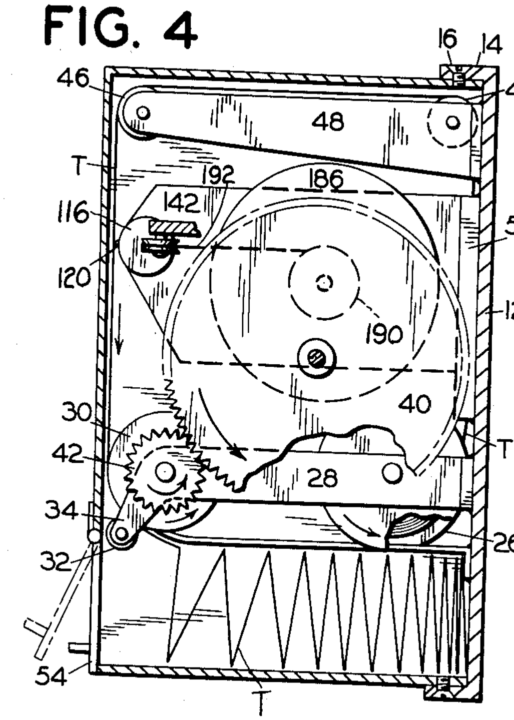
FIGURE 4 is a transverse sectional view taken on the line 3—3 of FIGURE 2.
Figures 7, 8, 9, 10:
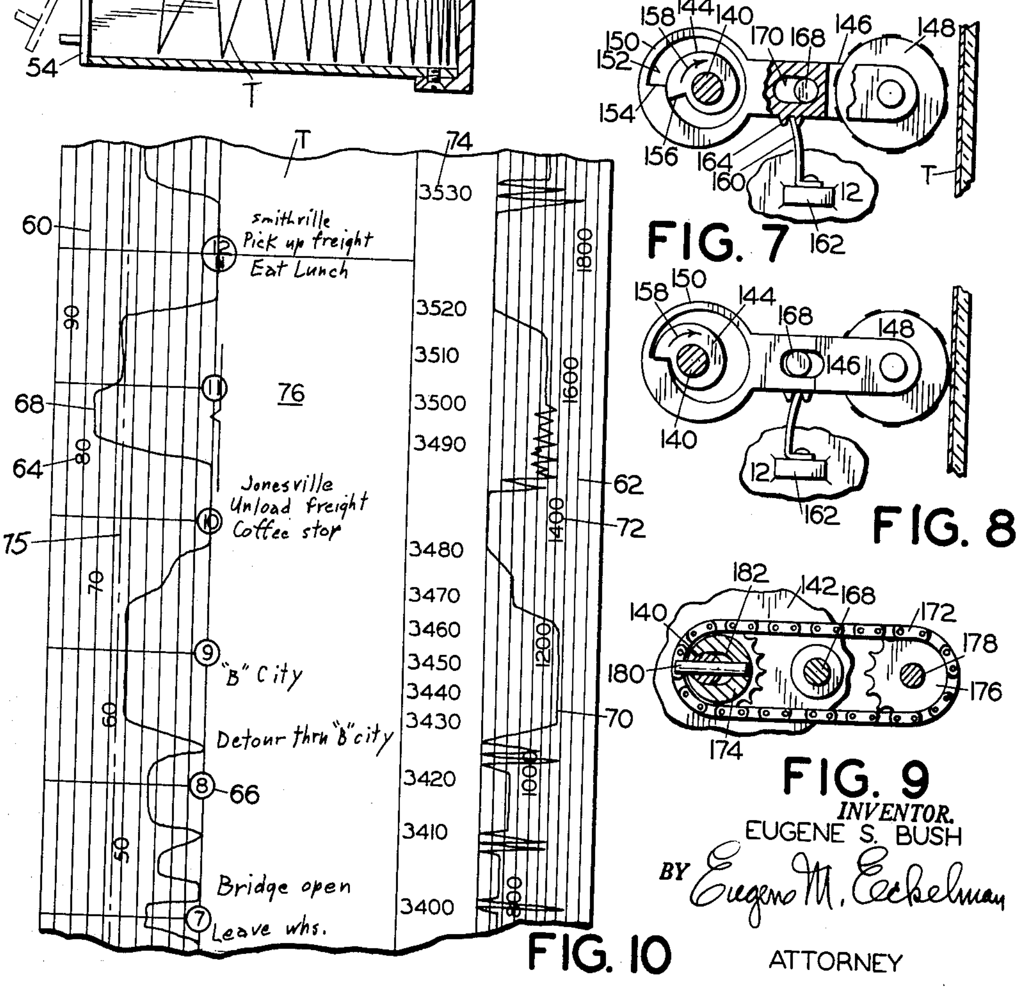
FIGURES 7 and 8 are fragmentary, enlarged sectional views both taken on the line 7—7 of FIGURE 2.
FIGURE 9 is an enlarged, fragmentary sectional view taken on the line 9—9 of FIGURE 2.
FIGURE 10 is a face view of a portion of tape utilized in combination with the present invention.

The tape supply and drive mechanism comprises a supply roll 26, FIGURE 4, for tape T. The construction of the tape is shown in FIGURE 10 and will be described in greater detail hereinafter. The roll 26 is rotatably supported on a pair of bracket arms 28 projecting forwardly from an integral connection with the back wall 12. The roll 26 is disposed adjacent the back wall 12, and a pulling roll 30 is also rotatably supported on bracket arms 28 but adjacent the front thereof. The front mounting of roll 30 is such that when tape rolls over the forward surface thereof the tape lies immediately adjacent the front wall of the housing and more particularly along the inner surface of pane 20.

Associated with pulling roll 30 is a friction roll 32 supported on a pair of links 34 depending from bracket arms 28. Roll 32 has a frictional engagement with roll 30 to provide a pulling drive for tape T engaged therebetween.

Roll 30 is driven by a motor 36, FIGURES 2 and 3, secured to a mounting bracket 38 in turn secured to the back wall 12. Motor 36 is a constant speed motor and has an output gear 40 meshing with a driven gear 42, FIGURES 3 and 4, secured to the shaft of roll 30. Motor 36 may be driven by the electrical system of the vehicle or preferably as shown may comprise a spring driven apparatus and have a winding handle 44. Also, a mechanical drive spring of the motor could be electrically wound.

With reference to FIGURE 4, the tape T passes from the supply roll 26 upwardly along the inner surface of back wall 12 and over a pair of top guide rollers 46. Rollers 46 are rotatably mounted on a pair of forwardly extending bracket arms 48 integrally secured to the back wall 12.

The back wall 12 has a guideway 50, FIGURE 2, for the tape the purpose of which is to provide a mounting support for other elements on the back wall 12 and still provide a passageway in which the tape can move upwardly along the rear inner surface of the housing.

The tape T passes downwardly from front guide roller 46 along the inner surface of the pane 20 and then between the rolls 30 and 32, the roll 30 being driven in a counterclockwise direction, as viewed in FIGURE 4, to pull the tape downwardly along the inner face of pane 20. Since the roll 30 is driven by the motor 36 at a uniform speed the tape T will also travel at a uniform speed. After passing through the rolls 30, 32, the tape is deposited in a lower compartment 52. The housing 10 has a front opening bottom door 54 for the purpose of removing the tape from the compartment 52.

In a preferred construction, the tape T, before it is wound on the roll 26 for supply to the user, is transversely creased at selected intervals whereby although the tape is substantially flat in its movement through the housing it will assume an accordion-like pleated arrangement when deposited in the compartment 52. This facilitates compact storage of the tape with the beginning end thereof at one end of the compartment. This neat storage method facilitates easy and methodical inspection of the tape since the starting end thereof is readily accessible, as opposed to arrangements where the printed tape is rolled onto rolls.

With reference to FIGURE 10 the tape has longitudinal sets of reference lines 60 and 62 on its front surface. These sets of reference lines extend longitudinally of the tape and are located on opposite sides thereof. Reference lines 60 represent speed of the vehicle, and speed designations 64 are printed on respective ones of said lines. The reference lines 62 represent engine operation and are identified by designations 65 which for purposes of illustration comprise r.p.m.'s. The tape also has hour designations 66 printed thereon. These designations may be located anyplace on the tape and it is not to be considered as limiting to locate said designations along the innermost line of reference lines 60 as shown.

Apparatus to be described is adapted to imprint a graph line 68 on reference lines 60 to chart or log the running speed such as miles per hour of the vehicle. Apparatus to be described also is adapted to imprint a graph line 70 on reference lines 62 to chart or log motor operation such as r.p.m.'s. or manifold vacuum pressure.

Apparatus of the present invention is also employed to imprint mileage designations on the tape, such mileage designations being represented by the reference numeral 74. Thus, as the tape progresses at a uniform rate past the various imprinting apparatus to be described the running speed of the vehicle and the engine operation is recorded, together with mileage designations. Since the tape also carries time designations 66, the graph lines 68 and 70 and the mileage designations can be correlated to the time.

Associated with the reference lines 60 is a parallel reference line 75, which may comprise a broken line as shown, or otherwise be set off distinctively from reference lines 60, designating the legal speed limit.

The sets of reference lines 60 and 62 are spaced from each other to form a blank write-in area 76 in which the operator may log explanatory notes or the like. The door 22 in window 18 is located in alignment with this blank area so that the operator can open the door and inscribe his notes on the tape. Indentations 77 are provided on each side of the pane 20 adjacent the door 22 which may be utilized to make reference points on the tape by running a pencil down the notched edge.

The tape T is formed of a transparent material in order that graph lines 68 and 70 and mileage designations 74 when printed on the rear surface thereof will show through to provide a front reading of the tape.

The apparatus for inscribing the graph line 68 will now be described. This apparatus is driven by a take-off cable 80 enclosed in a casing 81 and driven by the vehicle drive shaft. The end of this cable is non-circular and has a removable drive connection with a stub shaft 79 journaled in a bracket arm 82 integrated with the back wall 12 of the housing. Bracket arm 82 has an outwardly extending threaded projection 84 for receiving a cap 86 for mounting the speedometer take-off cable in place, the casing 81 of the cable having a collar 87 disposed interiorly of the cap 86 for holding the cable in drive position in the shaft 79.

Secured to the end of cable 80 is a pinion gear 88 (FIGURES 2 and 3) which meshes with a gear 90 secured on a shaft 92. One end of shaft 92 is journaled in the bracket arm 82 and the other end is journaled in another bracket arm 94 secured to the back wall 12 of the housing.

Secured to the shaft 92 for rotation therewith is a governor type member 100 having pivoted, expanding arms 102. Secured to the expandable portion of the member 100 and slidable on shaft 92 is a collar 104 having a right angle arm 106 slidably engaged in a guide lug 108 mounted on a plate or arm 109 secured to the back wall 12.

Figure 5:
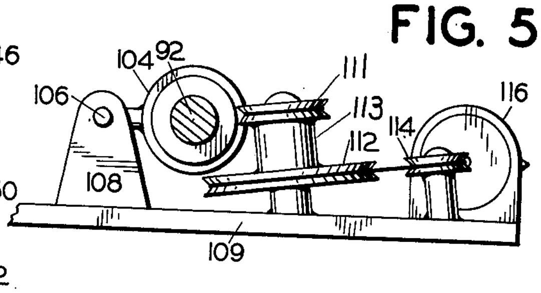
FIGURE 5 is a fragmentary, sectional view taken on the line 5—5 of FIGURE 2.

The collar 104 has one end of a cable 110 attached thereto. This cable is reeved over a first sheave 111, also seen in the detail view of FIGURE 5, integrated with a larger sheave 112 by means of a sleeve 113 rotatably mounted on the plate 109. The cable 110 leads from sheave 112 to a sheave 114 also rotatably mounted on the plate 109. From the sheave 114 the cable leads into a stylus housing 116 in which is incorporated a slide 118 to which the cable is attached and carrying a stylus 120 projecting forwardly through a slot 122 in the housing. The slide 118 is urged in a direction away from the sheave 114 by a compression spring 124. The size relationship of sheaves 111 and 112 magnifies the distance of travel of the stylus 120 as compared to that of the collar 104.

As apparent in FIGURE 4 the stylus is arranged to engage the tape T as the latter moves downwardly along the front of the housing 10. As the speed of the cable 80 varies, the member 100 in its expansion and contraction operates the stylus in a straight line transversely of the uniformly and continuously moving tape T to imprint the graph line 68.

Figure 6:
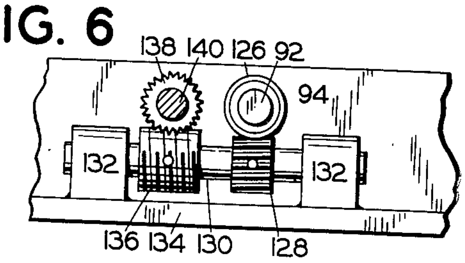
FIGURE 6 is a fragmentary, enlarged, sectional view taken on the line 6—6 of FIGURE 2.

With reference to FIGURES 2, 3 and 6 apparatus will now be described for imprinting mileage designations on the tape. For this purpose shaft 92 projects beyond the bracket arm 94 and has a worm 126 secured to such projecting end. Worm 126 meshes with a worm gear 128 secured to a cross shaft 130 journaled at its opposite ends in lugs 132 forming an integral part of a plate 134 secured to the back wall 12 and preferably also secured to the bracket arm 94. Shaft 130 has a worm 136 secured thereto and this worm meshes with a worm gear 138 secured on an auxiliary shaft 140 journaled at one end in the bracket arm 94 and at its other end in a bracket arm 142 secured to the back wall 12 of the housing.

Mounted on the shaft 140 is a cam 144 best viewed in FIGURES 7 and 8. Mounted on the cam 144 is an arm 146 which as best seen in FIGURE 2 has a bifurcated end portion for mounting numbering or mileage designation wheels 148 therebetween. Arm 146 has an end housing 150, FIGURES 7 and 8, the inner surface 152 of which is contoured to form a cam follower surface. This surface has a radially extending terminating edge or shoulder 154 which is substantially horizontal. Cam 144 is spiral-shaped and has a radial edge or shoulder 156. The cam and follower edge are arranged such that upon rotation of the shaft 140 and its cam 144 in the direction of arrow 158 in FIGURE 7, the arm 146 is permitted to travel to the left, FIGURES 7 and 8. When radial edge 156 of the cam moves to substantially a horizontal position or in other words to a neutral position past cam follower edge 154, the arm 146 is adapted to move to the right to imprint mileage designations on the back side of the tape. The arm 14 in its forward or printing movement is powered by a spring member 160 which may be in the form of a leaf spring as shown anchored to a bracket arm 162 secured to the back wall 12 of the housing. The free end of spring 160 is engaged between a pair of projections 164 on the underside of arm 146. Thus, as the cam 144 returns the arm 146 to its rearward position, it does so against the force of spring 160 as shown in FIGURE 7 and when the cam and cam follower edge reach their neutral association the spring forcefully moves the arm forward for a fast, non-smearing printing function with the tape.

Arm 146 has horizontal guiding support on a pin 168 mounted on bracket arm 142 and projecting into a slot 170 in the arm, the slot 170 being widened to permit forward and rearward movement of said arm.

The driving means for the numbering wheels 148 comprises a sprocket chain 172, FIGURES 2 and 9, in mesh with a first sprocket wheel 174 secured on shaft 140 and a second sprocket wheel 176 on a shaft 178 which supports the numbering wheels 148.

Since the arm 146 has forward and rearward movement, it is of course necessary that the sprocket wheels 174 and 176 have relative movement in the direction of movement of said arm. In this regard, and with particular reference to FIGURE 9, the sprocket wheel 174 is keyed to the shaft 140 by means of a pin 180 projecting through the shaft and the collar of this sprocket wheel. The bore 182 in the sprocket wheel 174 and in the collar for such sprocket wheel is elongated in the longitudinal direction of the sprocket chain. The pin 180 is slidable in the bore 182, whereby it will be seen that when the pin is axially directed toward the other sprocket 176 sprocket wheel 174 has adjustable movement longitudinally of the chain. Therefore, as the spring 144 moves the arm away from the tape the pin 180 permits rearward sliding of the sprocket 174 and when the cam edges 154 and 156 reach their neutral position forward sliding movement of the sprocket is permitted. The sprocket chain 172 preferably has a small amount of slack therein to facilitate forward and rearward movement of the arm prior to the release position of the sprocket 174 by its pin 180.

The drive ratio from the cable 80 to the shaft 140 is preselected to accomplish imprinting of mileage designations at selected intervals. As shown on the tape in FIGURE 10, and for purposes of illustration, the mileage has been printed at ten mile intervals. Such intervals depend upon the gear ratio between gears 88 and 90, 126 and 128, and 136 and 138.

Since the mileage designations 74 are printed on the back side of the tape it is apparent that the numbering wheels must suitably be arranged for reverse printing.

The apparatus for imprinting the graph line 70 which indicates engine performance comprises a tachometer 186, FIGURES 2 and 3, driven by a cable 188 from the distributor shaft. This could also be a flexible conduit connecting the intake manifold to a vacuum unit instead of a tachometer. Details of the tachometer 186 are not illustrated herein since such comprises conventional construction. These instruments designate motor operation on a dial, and in the present structure instead of utilizing a dial the dial shaft of the tachometer has a sheave 190 secured thereto to which is attached a cable 192 reeved over a guide sheave 194, FIGURE 2. The cable 192 operates a stylus 196 carried on a slide 198 in a stylus housing 200 supported on bracket arm 142, the cable being connected to said slide. The slide 198 is urged away from the sheave 194 in a straight line by a compression spring 202 confined in the housing. The stylus 196 projects forwardly of the housing through a suitable slot 204 in the latter for engagement with the back side of tape T.

Referring to FIGURE 3, it will be seen that plate 134 projects forwardly to a point adjacent the pane 20 and supports a cross plate 135 just behind the said pane. The spacing of pane 20 and plate 135 is such as to permit the tape to travel freely therebetween. The purpose of plate 135 is to form a backing support for the tape when the operator makes manual designations on the tape through the door 22.

Thus, in accordance with the present invention the stylus 120 and the stylus 196, as operated by their respective mechanisms, draw graph lines which log functions of vehicle operation. The styluses 120 and 196 are mounted immediately adjacent the upper edge of the window so that recorded data is immediately viewable. Not only is the running speed of the vehicle and the motor performance indicated on the tape, but in addition each of these is correlated with mileage indications and the time of day. Thus, the tape can be inspected either during operation of the vehicle or later to determine the running speed and engine operation as well as the time and mileage schedule thereof. The area 76 of the tape permits the operator to make entries which may be of interest.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. An information recording instrument for a motor of the type adapted to rotate a drive shaft, comprising a housing, a flat strip of elongated tape in said housing, guide means for directing said tape in a selected path, power means driving said tape at a uniform speed in a longitudinal direction, first marking means movable linearly transversely of said tape to apply marking means thereon, rotatable shaft means connected with said marking means and adapted to be driven by the drive shaft of the motor for moving said marking means in recording operating speed conditions of the drive shaft, mileage stamping means in said housing transversely aligned with said first marking means adjacent said tape, drive means on said rotatable shaft means engageable with said mileage stamping means for reciprocating the latter at uniform rotation intervals of the shaft means into stamping engagement with said tape, second marking means movable linearly transversely of said tape to apply markings thereon, and power means connected with said second marking means and adapted to be operated in connection with the motor for moving said second marking means in recording operating conditions of the motor.

2. An information recording instrument for a motor of the type adapted to rotate a drive shaft, comprising a housing, a flat strip of elongated tape in said housing, guide means for directing said tape in a selected path, power means driving said tape at a uniform speed in a longitudinal direction, first marking means movable linearly transversely of said tape to apply marking means thereon, rotatable shaft means connected with said marking means and adapted to be driven by the drive shaft of the motor for moving said marking means in recording operating speed conditions of the drive shaft, mileage stamping means in said housing transversely aligned with said first marking means adjacent said tape and being movable toward and away from said tape, cam means on said rotatable shaft means engageable with said mileage stamping means for reciprocating the latter at uniform rotation intervals of the shaft means into stamping engagement with said tape.

3. An information recording instrument for a motor of the type adapted to rotate a drive shaft, comprising a housing, a front wall on said housing having an inner surface, a roll of tape mounted in said housing, guide means in said housing directing the free end of the tape along the inner surface of said front wall in close association therewith, power means driving the tape at a uniform speed in a longitudinal direction along said front wall inner surface, marking means movably mounted in said housing rearwardly of said tape and arranged to apply markings on the rear surface of said tape while pressing the latter against the inner surface of said front wall, rotatable shaft means connected with said marking means and adapted to be driven by the drive shaft of the motor for moving said marking means in marking engagement with said tape, and a window in the front wall of said housing adjacent a portion of the path of travel of said tape for viewing markings on said tape made by said marking means, said tape being of a structure whereby markings on its back side are visible through said window.

4. The information recording instrument of claim 3 wherein said tape has reference lines for associated marking thereon of a graph line by said marking means, a blank area extending longitudinally of the tape, the tape being arranged in its longitudinal movement such that said blank area moves past said window for receiving manual write-in markings through the window, and a backing plate secured to said housing and disposed on the rear side of said tape for providing a support for manually marking on the front of the tape.

5. The information recording instrument of claim 3 wherein said instrument has second marking means arranged to be operated by the vehicle and said tape has two sets of longitudinal reference lines for associated marking thereon of independent graph lines by the two marking means, and a blank area extending longitudinally of the tape between the two sets of reference lines, the tape being arranged in its longitudinal movement such that said blank area moves past said window for receiving manual write-in markings on the front of the tape.

References Cited by the Examiner

UNITED STATES PATENTS

| | | | |
|---|---|---|---|
| 800,617 | 9/05 | Morse et al. | 346—61 |
| 890,100 | 6/08 | Shedlock | 346—18 |
| 1,234,852 | 7/17 | Avram | 346—135 |
| 1,503,078 | 7/24 | Wallbillich | 346—73 |
| 1,553,809 | 9/25 | Everett | 346—139 X |
| 2,341,118 | 2/44 | Rodanet | 346—18 |
| 2,385,399 | 9/45 | Branham | 346—33 |
| 2,668,094 | 2/54 | Chelf | 346—73 |
| 2,718,448 | 9/55 | Powers | 346—18 |
| 2,976,102 | 3/61 | Palmer | 346—18 |
| 2,981,585 | 4/61 | Lower | 346—18 |
| 3,013,854 | 12/61 | Vogtlin et al. | 346—18 |
| 3,099,817 | 7/63 | Kendall | 346—33 X |
| 3,104,146 | 9/63 | Cool et al. | 346—18 |

LEO SMILOW, *Primary Examiner.*